(12) United States Patent
Endo et al.

(10) Patent No.: US 9,805,484 B2
(45) Date of Patent: Oct. 31, 2017

(54) GRAPH DISPLAY CONTROL DEVICE, ELECTRONIC DEVICE, GRAPH DISPLAY METHOD AND STORAGE MEDIUM RECORDING GRAPH DISPLAY CONTROL PROCESSING PROGRAM

(71) Applicant: CASIO COMPUTER CO., LTD., Shibuya-ku, Tokyo (JP)

(72) Inventors: Kota Endo, Hachioji (JP); Kentaro Suzuki, Hamura (JP); Kosuke Karoji, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/574,141

(22) Filed: Dec. 17, 2014

(65) Prior Publication Data

US 2015/0187105 A1 Jul. 2, 2015

(30) Foreign Application Priority Data

Dec. 27, 2013 (JP) ................................. 2013-271793

(51) Int. Cl.
*G09G 5/02* (2006.01)
*G06T 11/20* (2006.01)
(Continued)

(52) U.S. Cl.
CPC ........ *G06T 11/206* (2013.01); *G06F 15/0225* (2013.01); *G06T 11/001* (2013.01); *G06T 11/203* (2013.01)

(58) Field of Classification Search
CPC .. G06F 15/0225; G06T 11/203; G06T 11/001; G06T 11/206
See application file for complete search history.

(56) References Cited

U.S. PATENT DOCUMENTS 3,789,203 A 1/1974 Catherall et al.
4,217,702 A 8/1980 Bennett
(Continued)

FOREIGN PATENT DOCUMENTS

CN 101030119 A 9/2007
JP 08179749 A 7/1996
(Continued)

OTHER PUBLICATIONS

Desmos, Desmos User Guide, http://s3.amazonaws.com/desmos/Desmos_Calculator_User_Guide.pdf, Feb. 2, 2013, 1-10.*
(Continued)

*Primary Examiner* — Robert Craddock
(74) *Attorney, Agent, or Firm* — Holtz, Holtz & Volek PC

(57) ABSTRACT

A graph display control device includes a formula display control unit, a graph display control unit and an operation-display-element display control unit. The formula display control unit displays a plurality of function formulas containing parameters on a display unit. The graph display control unit displays a graph image corresponding to one of the plurality of function formulas displayed by the formula display control unit, on the display unit so as to be discriminable according to the plurality of function formulas. The operation-display-element display control unit discriminately displays an operation display element for designating a numerical value of a parameter contained in at least one of the plurality of function formulas, on the display unit in correspondence to the graph images respectively displayed discriminately in relation to the function formulas by the graph display control unit.

15 Claims, 13 Drawing Sheets

(51) Int. Cl.
*G06F 15/02* (2006.01)
*G06T 11/00* (2006.01)

(56) References Cited

U.S. PATENT DOCUMENTS

| | | | |
|---|---|---|---|
| 4,794,553 A | | 12/1988 | Watanabe et al. |
| 5,289,205 A | | 2/1994 | Torres |
| 5,303,338 A | | 4/1994 | Handa et al. |
| 5,532,946 A | | 7/1996 | Phipps et al. |
| 5,539,427 A | | 7/1996 | Bricklin et al. |
| 5,539,867 A | | 7/1996 | Handa et al. |
| 5,739,823 A | | 4/1998 | Akaza et al. |
| 5,825,355 A | | 10/1998 | Palmer et al. |
| 5,999,193 A | * | 12/1999 | Conley, Jr. ............ G06T 11/206 345/440 |
| 6,133,924 A | | 10/2000 | Ito et al. |
| 6,208,343 B1 | | 3/2001 | Roth |
| 6,256,595 B1 | | 7/2001 | Schwalb et al. |
| 6,429,869 B1 | | 8/2002 | Kamakura et al. |
| 6,918,768 B2 | | 7/2005 | Bardige et al. |
| 6,922,816 B1 | | 7/2005 | Amin et al. |
| 7,289,120 B2 | | 10/2007 | Fukaya et al. |
| 7,747,981 B2 | | 6/2010 | Gray |
| 8,089,482 B1 | * | 1/2012 | Axelrod .................. G09G 5/02 345/440 |
| 8,259,115 B2 | * | 9/2012 | Okano ................ G06F 15/0225 345/440 |
| 8,407,580 B2 | | 3/2013 | Gray et al. |
| 8,413,116 B2 | | 4/2013 | Gray |
| 9,098,858 B2 | | 8/2015 | Xia et al. |
| 9,202,433 B2 | | 12/2015 | Webb et al. |
| 2004/0083247 A1 | | 4/2004 | Koont |
| 2004/0114258 A1 | | 6/2004 | Harris, III et al. |
| 2004/0227738 A1 | | 11/2004 | Sudoh |
| 2006/0204139 A1 | | 9/2006 | Hayashi |
| 2007/0046674 A1 | | 3/2007 | Sudoh |
| 2007/0073705 A1 | | 3/2007 | Gray |
| 2007/0153001 A1 | | 7/2007 | Yu et al. |
| 2007/0195093 A1 | | 8/2007 | Springer et al. |
| 2007/0198620 A1 | | 8/2007 | Nilakantan et al. |
| 2007/0298389 A1 | | 12/2007 | Yu et al. |
| 2008/0143746 A1 | | 6/2008 | Irons |
| 2008/0250347 A1 | | 10/2008 | Gray et al. |
| 2008/0256489 A1 | | 10/2008 | Maurer et al. |
| 2009/0063206 A1 | | 3/2009 | Payne et al. |
| 2009/0102846 A1 | * | 4/2009 | Flockermann ........ G06T 11/206 345/440 |
| 2009/0115782 A1 | | 5/2009 | Irons et al. |
| 2009/0164886 A1 | | 6/2009 | Shah et al. |
| 2009/0307587 A1 | | 12/2009 | Kaneko |
| 2010/0070931 A1 | | 3/2010 | Nichols |
| 2010/0156830 A1 | | 6/2010 | Homma et al. |
| 2011/0004864 A1 | | 1/2011 | Gray |
| 2011/0043517 A1 | | 2/2011 | Schneider et al. |
| 2011/0227946 A1 | | 9/2011 | Yoshizawa et al. |
| 2011/0254862 A1 | | 10/2011 | Okano |
| 2012/0030626 A1 | | 2/2012 | Hopkins et al. |
| 2012/0159370 A1 | | 6/2012 | Rode et al. |
| 2012/0306879 A1 | | 12/2012 | Yokoyama |
| 2013/0050064 A1 | | 2/2013 | Okano |
| 2013/0097551 A1 | | 4/2013 | Hogan |
| 2013/0235069 A1 | | 9/2013 | Ubillos et al. |
| 2013/0268263 A1 | | 10/2013 | Park et al. |
| 2014/0096056 A1 | | 4/2014 | Latzina |
| 2014/0253542 A1 | | 9/2014 | Jung et al. |
| 2014/0282252 A1 | | 9/2014 | Edwards et al. |
| 2014/0317570 A1 | | 10/2014 | Endo |
| 2014/0365947 A1 | | 12/2014 | Karoji |
| 2015/0170372 A1 | | 6/2015 | Rubins et al. |
| 2015/0187106 A1 | | 7/2015 | Endo |
| 2015/0268845 A1 | | 9/2015 | Endo |
| 2016/0041944 A1 | | 2/2016 | Karoji |
| 2016/0077725 A1 | | 3/2016 | Maeda |

FOREIGN PATENT DOCUMENTS

| | | |
|---|---|---|
| JP | 09050273 A | 2/1997 |
| JP | 09185586 A | 7/1997 |
| JP | 09282475 A | 10/1997 |
| JP | 11328279 A | 11/1999 |
| JP | 2004199260 A | 7/2004 |
| JP | 2004206541 A | 7/2004 |
| JP | 2004326691 A | 11/2004 |
| JP | 2005107862 A | 4/2005 |
| JP | 2005182125 A | 7/2005 |
| JP | 2011181050 A | 9/2011 |
| JP | 2011185911 A | 9/2011 |
| JP | 2012014440 A | 1/2012 |
| JP | 2012203605 A | 10/2012 |
| JP | 2013045147 A | 3/2013 |
| JP | 2013050746 A | 3/2013 |
| WO | 2004029791 A2 | 4/2004 |

OTHER PUBLICATIONS

Related U.S. Appl. No. 14/582,129; First Named Inventor: Kota Endo; Title: "Graph Display Control Apparatus, Electronic Device, Graph Display Method, and Storage Medium Storing Graph Display Control Process Program"; filed Dec. 23, 2014.
Related U.S. Appl. No. 14/657,851; First Named Inventor: Kota Endo; Title: "Graphic Drawing Device and Recording Medium Storing Graphic Drawing Program"; filed Mar. 13, 2015.
U.S. Appl. No. 14/298,586; First Named Inventor: Kosuke Karoji; Title: "Electronic Apparatus, Graph Display Method and Computer Readable Medium"; filed Jun. 6, 2014.
U.S. Appl. No. 14/254,594; First Named Inventor: Kota Endo; Title: "Graph Display Device, Graph Display Method and Computer—Readable Medium Recording Control Program"; filed Apr. 16, 2014.
U.S. Appl. No. 14/807,702; First Named Inventor: Kosuke Karoji; Title: "Graph Display Apparatus, Graph Display Method and Program Recording Medium" filed Jul. 23, 2015.
U.S. Appl. No. 14/854,773; First Named Inventor: Naoya Maeda; Title: "Figure Display Apparatus, Figure Display Method, and Storage Medium Storing Figure Display Program"; filed Sep. 15, 2015.
Page, "Quadratic curve and graph display (standard form)", Math Open Reference, Jan. 1, 2009.
"Fluid Math-2, Fluid Graphing Calculator for iPad", Sep. 20, 2012, https://www.youtube.com/watch?v=Nz8WP-NVXJc.
"Fluid Math-3, SmartBoard Math Software for Algebra Teachers", Feb. 25, 2012, https://www.youtube.com/watch?v=LRqOBK03g2E.
"FluidMath-1 Introduction—Tablet and Interactive Whiteboard Math Software", Mar. 2, 2011, https://www.youtube.com/watch?v=BAFGONn4KoQ.
"Sketch2Graph iPad App (Tutorial)", Nov. 30, 2012, https://www.youtube.com/watch?v=0ss1MPU-TBE.
Japanese Office Action dated Aug. 1, 2017 issued in counterpart Japanese Application No. 2013-271793.

* cited by examiner

GRAPH DISPLAY CONTROL DEVICE, ELECTRONIC DEVICE, GRAPH DISPLAY METHOD AND STORAGE MEDIUM RECORDING GRAPH DISPLAY CONTROL PROCESSING PROGRAM

CROSS-REFERENCE TO RELATED APPLICATION

This application claims priority based on Japanese Patent Application No. 2013-271793, filed on Dec. 27, 2013, the entire contents of which are incorporated by reference herein.

BACKGROUND OF THE INVENTION

Field of the Invention

The present invention relates to graph display control devices for displaying graph images according to function formulas, electronic devices and graph display methods etc.

Description of the Related Art

Conventionally, in a function electronic calculator (graph function electronic calculator) having a graph display function, when an arbitrary function formula of $y=f(x)$ is inputted, a graph image according to the inputted function formula is displayed on a display unit.

In this respect, sometimes it is demanded to view the change of the graph image by changing the numerical value of the parameter of the term in the function formula. In order to satisfy such the demand, there has been proposed a graph function electronic calculator (JP-A-09-282475, for example). In this graph function electronic calculator, in a state that a secondary function formula of $y=AX^2+X+1$, for example, is inputted, a screen dedicated for setting the numerical value of the parameter A is displayed. Then, the initial value (Start), final value (End) and changing interval (Pitch) of the parameter A are inputted and set on the dedicated screen, whereby graph images corresponding to the respective function formulas according to the change of the numerical value of the parameter A are displayed as dynamic graphs on the display unit.

There has been proposed another graph function electronic calculator (JP-A-2011-181050, for example) in which, as to the value of a parameter to be changed contained in a function formula, different values of the parameter are displayed by different colors, respectively, and each of graph images corresponding to the respective function formulas according to the different parameter values is displayed by the same color as the display color of corresponding one of the different parameter values.

SUMMARY OF THE INVENTION

Technical Problem to be Solve

In the graph function electronic calculators of the related art, in the case of displaying a plurality of graph images respectively according to a plurality of function formulas, and then changing one of the graph images corresponding to one of the function formulas by changing the numerical value of one parameter contend in the one function formula to thereby analyze the one graph image by comparing with the remaining graph images, it is difficult to discriminate as to which one of the graph images corresponds to the parameter which value is to be changed. Thus, it can be confirmed for the first time as to which one of the graph images changes after actually changing the value of the parameter.

This invention has been made in view of the aforesaid problem, and provides a graph display control device, an electronic device and control program thereof each of which can display, in a case of displaying graph images respectively according to a plurality of function formulas, one graph image corresponding to the parameter to be changed of one of the function formulas so as to be able to easily discriminate the one graph image.

Technical Solution

The graph display control device according to the invention includes a formula display control unit, a graph display control unit and an operation-display-element display control unit. The formula display control unit displays a plurality of function formulas containing parameters on a display unit. The graph display control unit displays a graph image corresponding to one of the plurality of function formulas displayed by the formula display control unit, on the display unit so as to be discriminable according to the plurality of function formulas. The operation-display-element display control unit discriminately displays an operation display element for designating a numerical value of a parameter contained in at least one of the plurality of function formulas, on the display unit in correspondence to the graph images respectively displayed discriminately in relation to the function formulas by the graph display control unit.

DETAILED DESCRIPTION OF THE INVENTION

Hereinafter, embodiments according to the invention will be explained with reference to drawings.

Figure 1:
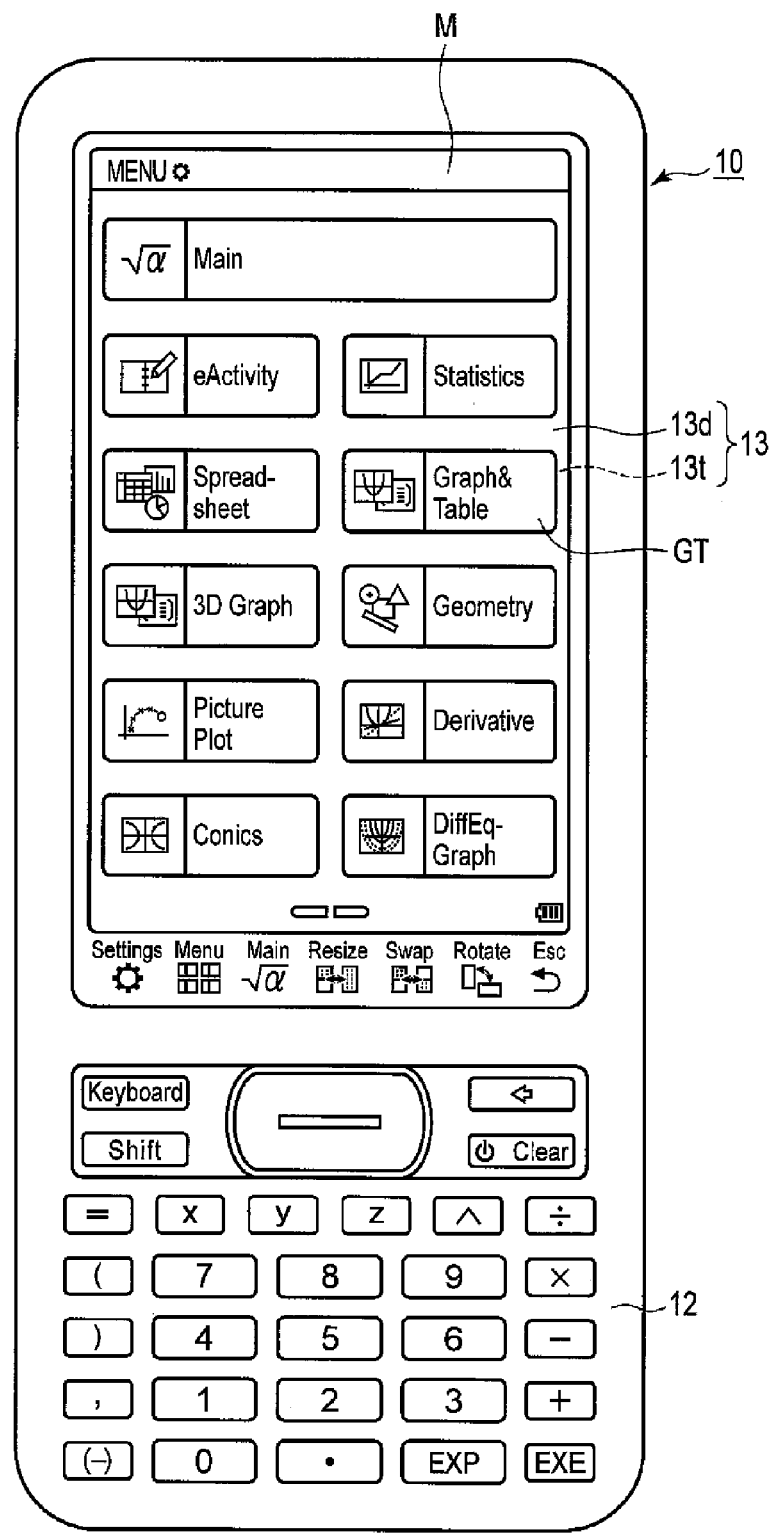
FIG. 1 is a front view showing the outside configuration of a graph function electronic calculator 10 according to an embodiment of a graph display control device of the invention.

FIG. 1 is a front view showing the outside configuration of the graph function electronic calculator 10 according to an embodiment of a graph display control device of the invention.

The graph display control device is configured as the dedicated graph function electronic calculator 10 as explained below or as a tablet terminal, a mobile phone or a portable game machine, for example, each having a graph display function according to function formulas.

The graph function electronic calculator 10 has a function of displaying inputted function formulas and graph images respectively according to the function formulas.

The main body of the graph function electronic calculator 10 is provided with a key input part 12 at an almost lower half area of the front surface thereof and a touch panel display part 13 at an almost upper half area thereof.

The key input part 12 is provided with numerical value/symbol keys, function/operator keys and a cursor key etc.

The numeral/symbol keys are configured by keys for inputting numerical values and symbols which is an arrangement of numeral keys and symbol keys.

The function/operator keys are configured by various kinds of function keys operated at the time of inputting a function formula and operator keys operated at the time of inputting operators such as [+], [−], [×], [÷] or [=].

The touch panel display part 13 is configured by overlapping a transparent touch panel 13t on a liquid crystal display screen 13d capable of performing color display.

The graph function electronic calculator 10 displays a main menu M as shown in FIG. 1 according to the touch operation of a menu button [Menu] displayed at the lower end of the touch panel display part 13. When one of various kinds of icons displayed on the main menu M is selectively touched, the graph function electronic calculator is placed in an operation mode of a function according to the icon thus touched.

In this embodiment, the explanation will be made as to the operation mode (graph mode) of a graph function activated by a [Graph & Table] icon GT.

Figure 2:
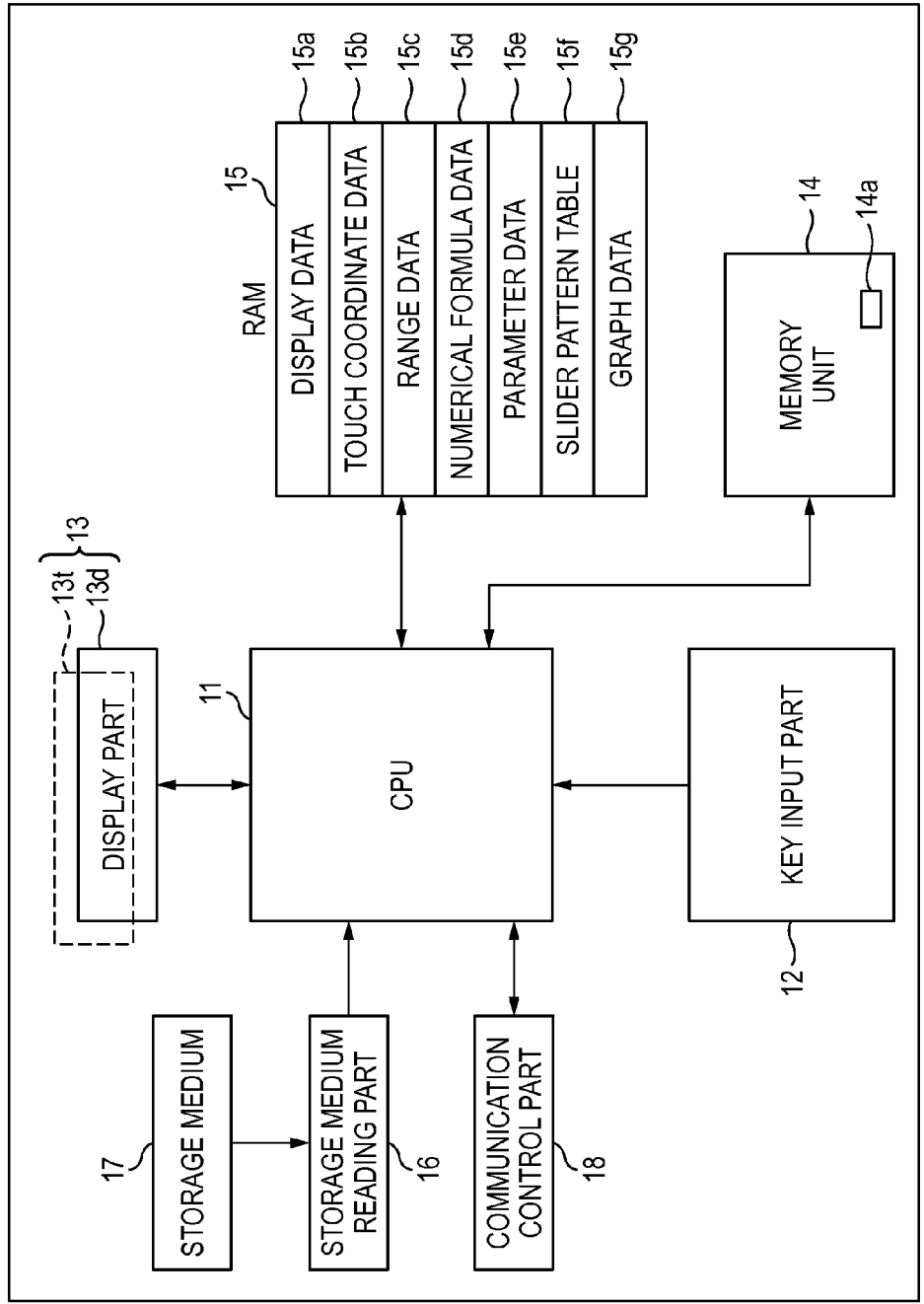
FIG. 2 is a block diagram showing the circuit configuration of the graph function electronic calculator 10.

FIG. 2 is a block diagram showing the circuit configuration of the graph function electronic calculator 10.

The graph function electronic calculator 10 includes a CPU 11 as a microcomputer.

According to electronic calculator control program 14a stored in advance in a memory unit 14 such as a flash ROM, the electronic calculator control program 14a stored in the memory unit 14 via a storage medium reading part 16 from an external storage medium 17 such as a memory card, or the electronic calculator control program 14a downloaded in the memory unit 14 via a communication control part 18 from a Web server (program server) on a communication network (internet), the CPU 11 controls the operations of the respective portions of the circuit using a RAM 15 as a work memory to thereby execute various kinds of the functions of the graph function electronic calculator 10 such as an electronic calculator function and a function graph drawing function.

The memory unit 14, the RAM 15, the storage medium reading part 16 and the communication control part 18 etc. as well as the key input part 12 and the touch panel display part 13 shown in FIG. 1 are connected to the CPU 11.

The RAM 15 stores various kinds of data necessary for the processing operation of the CPU 11. The RAM 15 includes not only a display data memory area 15a in which data to be displayed in colors on the touch panel display part 13 is developed but also a touch coordinate data memory area 15b, a range data memory area 15c, a numerical formula data memory area 15d, a parameter data memory area 15e, a slider pattern table 15f and a graph data memory area 15g.

The touch coordinate data memory area 15b stores the coordinate data of a touch position according to a user operation which is detected by the touch panel display part 13.

The range data memory area 15c stores an X-coordinate range (Xmin to Xmax) and a Y-coordinate range (Ymin to Ymax) representing the display range of a graph image set with respect to the graph image area G (see FIGS. 5A and 5B) of the touch panel display part 13 in the graph mode.

The numerical formula data memory area 15d stores data relating to a function formula y=f(x) inputted by the operation of the key input part 12 together with display color data on a graph formula area F (see FIGS. 5A and 5B) set for each of function formulas y1, y2, - - - . In this embodiment, the display colors of the function formulas are set to five kinds. That is, the display color of the function formula y1 is set to "blue", y2 is set to "red", y3 is set to "green", y4 is set to "pink" and y5 is set to "black", and the display colors of the function formula y6 and the succeeding function formulas are set so as to repeat these five colors.

The parameter data memory area 15e stores data relating to parameters of respective terms contained in the function formula y=f(x) stored in the numerical formula data memory area 15d together with the symbols (a, b, c, - - - , for example) of the parameters and numeral data set to the parameters.

The slider pattern table 15f stores data relating to patterns of parameter sliders SL1, SL2, SL3 (see FIG. 5B) respectively acting as operation display elements for designating numerical values of the parameters a, b, c stored in the parameter data memory area 15e according to the operation of a user. Further, the slider pattern table stores data relating to the display colors of the respective sliders and data relating to the variable minimum value (Min), the variable maximum value (Max), the current value (Current) and the change value (Step) of each of the parameters. The display color of each of the parameter sliders SL1, SL2, SL3 is set to be same as the display color of the corresponding function formula yn containing the corresponding parameter. Further, "1", "5", "1" and "1" are set as the initial values of the variable minimum value (Min), the variable maximum value (Max), the current value (Current) and the change value (Step) of each of the parameters, respectively.

The change value (Step) of each of the parameters stored in the slider pattern table 15f represents a decrement or increment change value according to a single touch operation with respect to the left button "←" Bd or the right button "→" Bu of the parameter slider SLn. Separately from this change value, the slider pattern table also stores a change value (Dot) corresponding to the movement width of one display dot in the variable range W (Tmin to Tmax) of the knob T of the parameter slider SLn.

In this respect, the change value (Step) according to the single touch operation with respect to the left button "←" Bd or the right button "→" Bu of the parameter slider SLn is defined as a step unit, whilst the change value (Dot) corresponding to the movement width of one display dot in the variable range W (Tmin to Tmax) of the knob T of the parameter slider SLn is defined as a dot unit.

The graph data memory area 15g stores data relating to graphs generated based on the function formula y=f(x) stored in the numerical formula data memory area 15d and the parameter values of the respective terms contained in the function formula y=f(x) stored in parameter data memory area 15e, as data representing the drawing positions of the graph images according to the respective function formulas y1, y2, - - - and data representing the display colors of the respective graph images y1, y2, - - - . The display color of each of the graph images y1, y2, - - - is same as the display color of the corresponding function formula yn.

That is, the display color of the function formula yn stored in the numerical formula data memory area 15d is same as the display color of the parameter slider SLn, stored in the numerical formula data memory area 15d, for changing the numerical value of the parameter contained in the function formula yn, and also same as the display color of the graph image yn stored in the graph data memory area 15g according to the function formula yn which parameter value is changed by the parameter slider SLn.

In the graph function electronic calculator 10 configured in this manner, the CPU 11 controls the operations of the respective portions of the circuit according to the instructions of various processing described in the electronic calculator control program 14a, thereby realizing various kinds of functions described in the following explanation of the operations by the cooperation of the software and the hardware.

Next, the operation of the graph function electronic calculator 10 configured in the aforesaid manner will be explained.

Figure 3A:
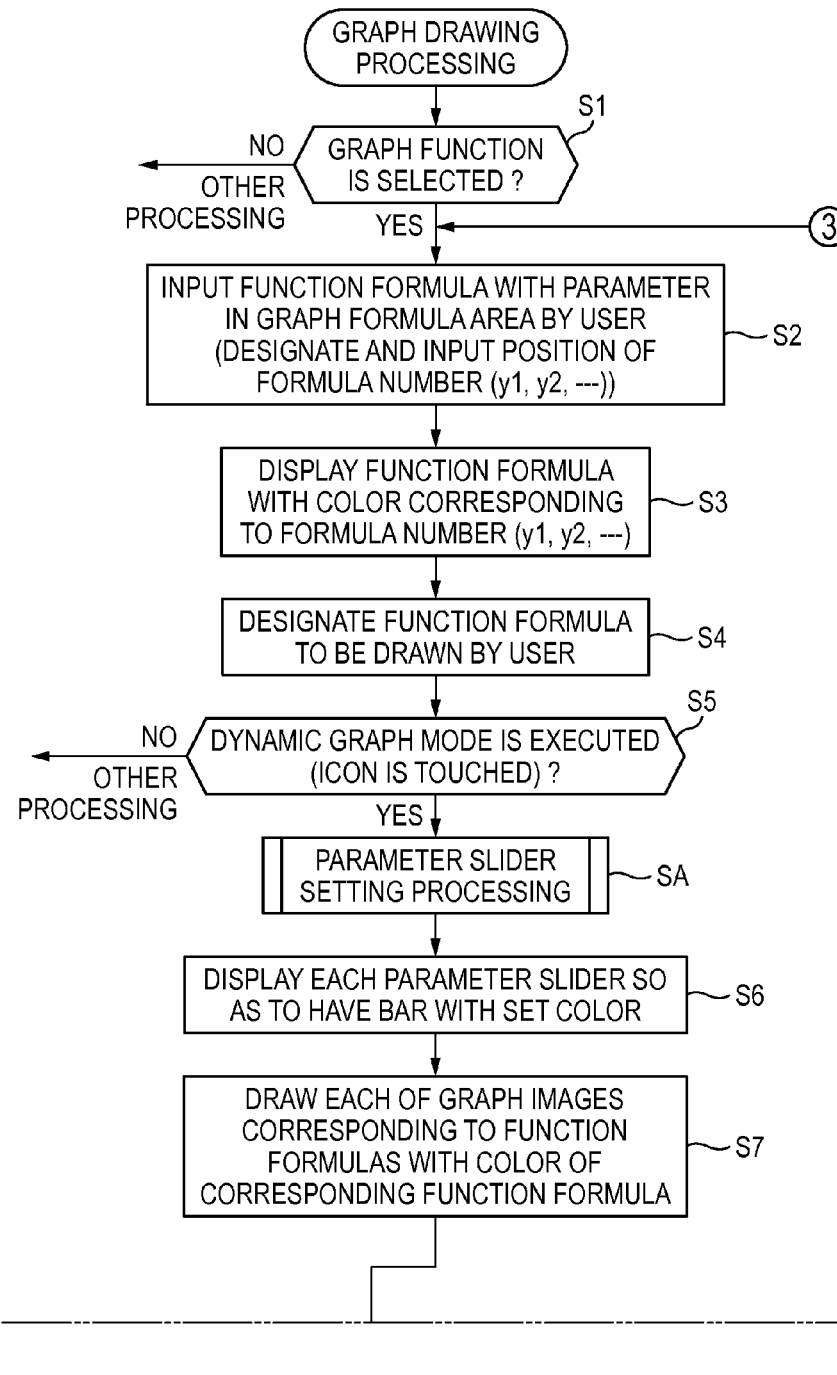
FIG. 3A is a flowchart showing the graph drawing processing (No. 1) of the graph function electronic calculator 10.
Figure 3A:
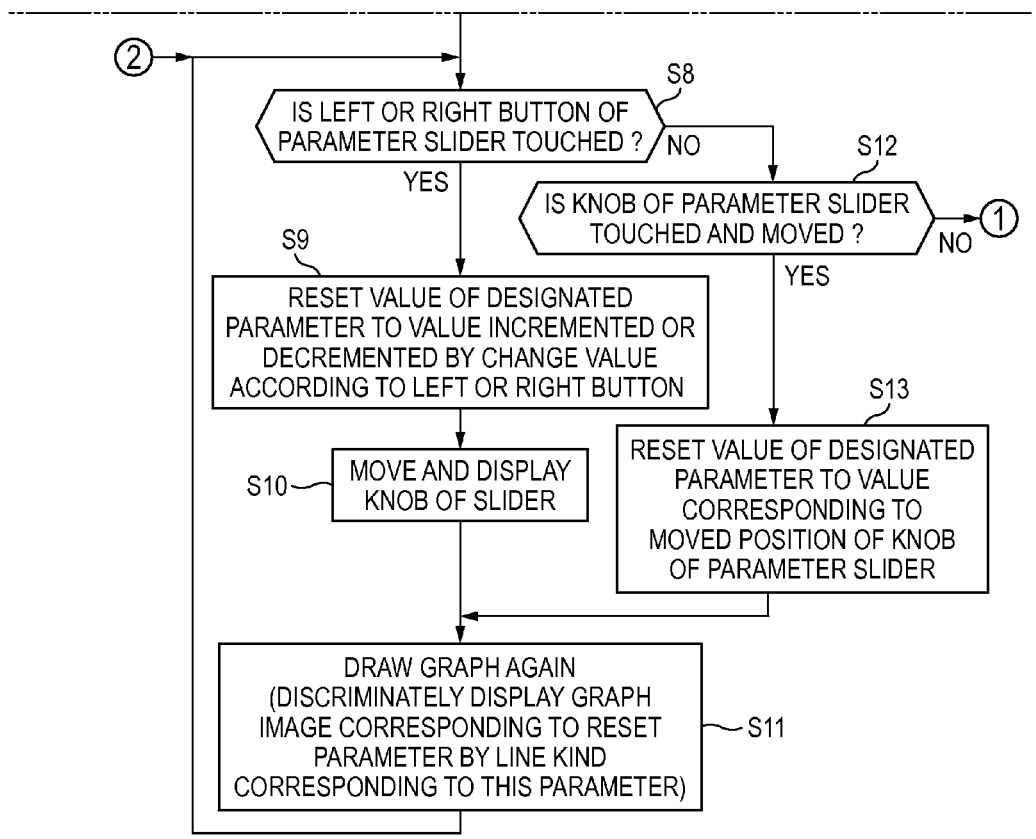

FIG. 3A is a flowchart showing the graph drawing processing (No. 1) of the graph function electronic calculator 10.

Figure 3B:
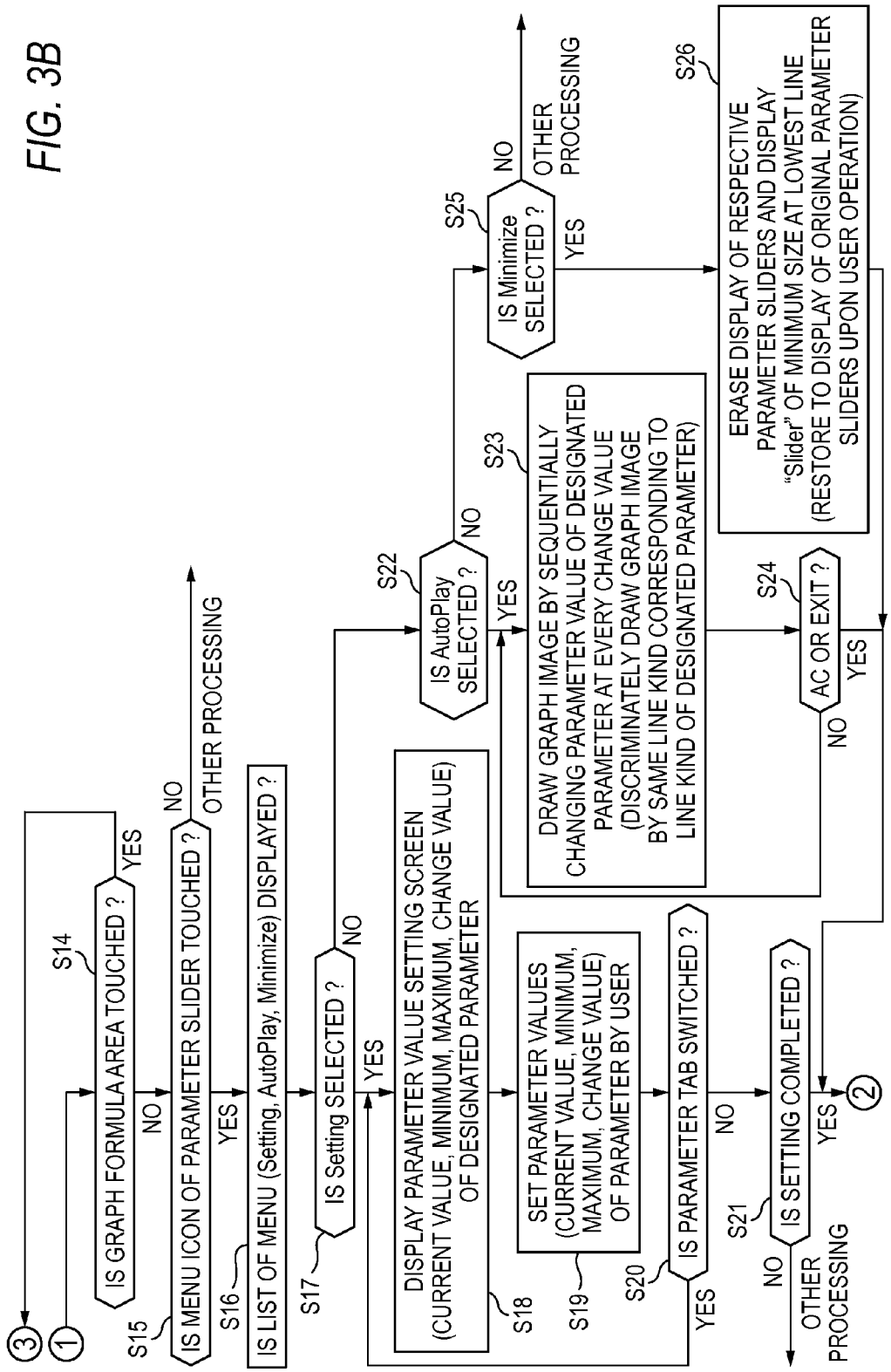
FIG. 3B is a flowchart showing the graph drawing processing (No. 2) of the graph function electronic calculator 10.

FIG. 3B is a flowchart showing the graph drawing processing (No. 2) of the graph function electronic calculator 10.

Figure 4:
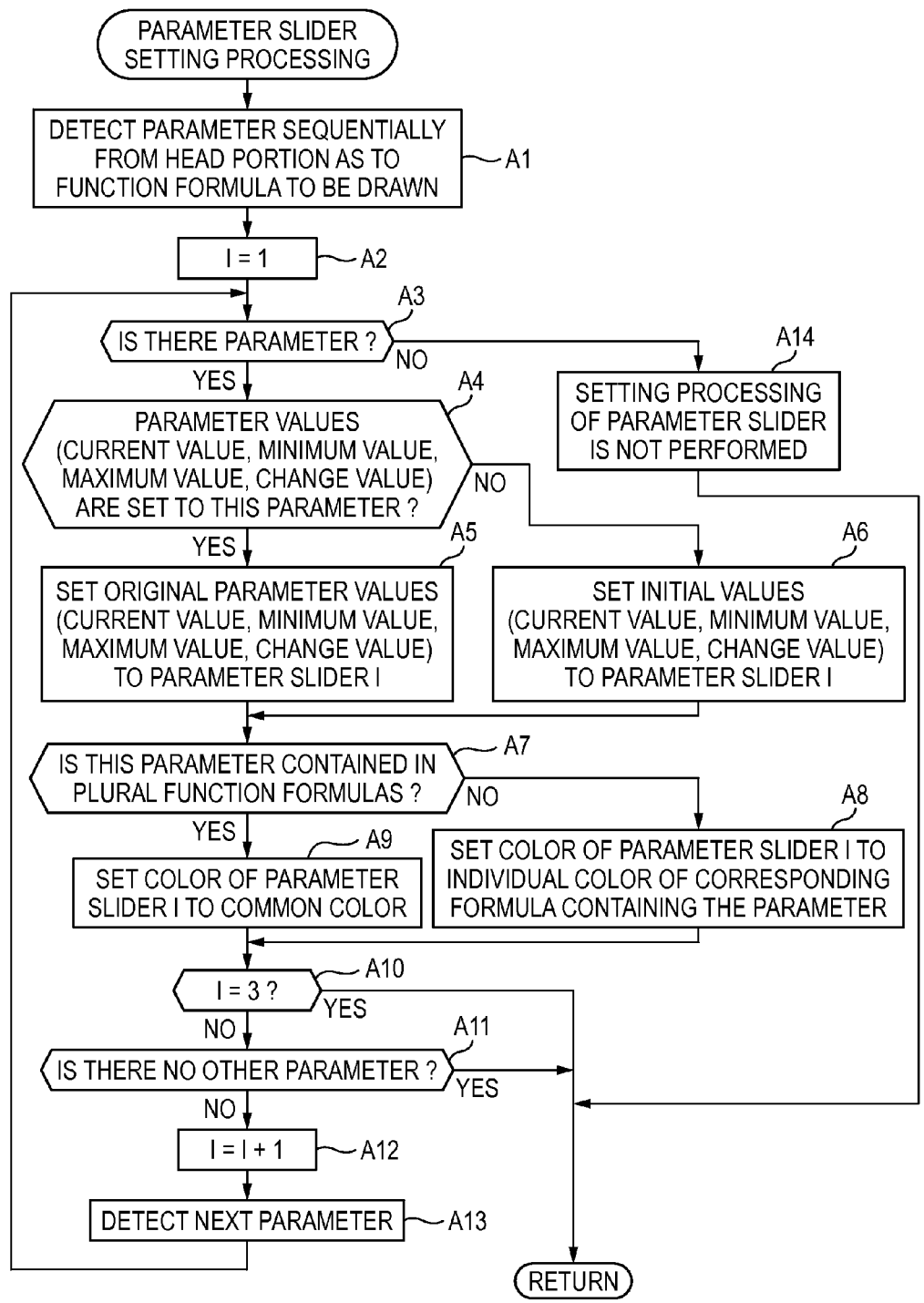
FIG. 4 is a flowchart showing a parameter slider setting processing according to the graph drawing processing of the graph function electronic calculator 10.

FIG. 4 is a flowchart showing a parameter slider setting processing according to the graph drawing processing of the graph function electronic calculator 10.

Figures 5A, 5B, 5C:
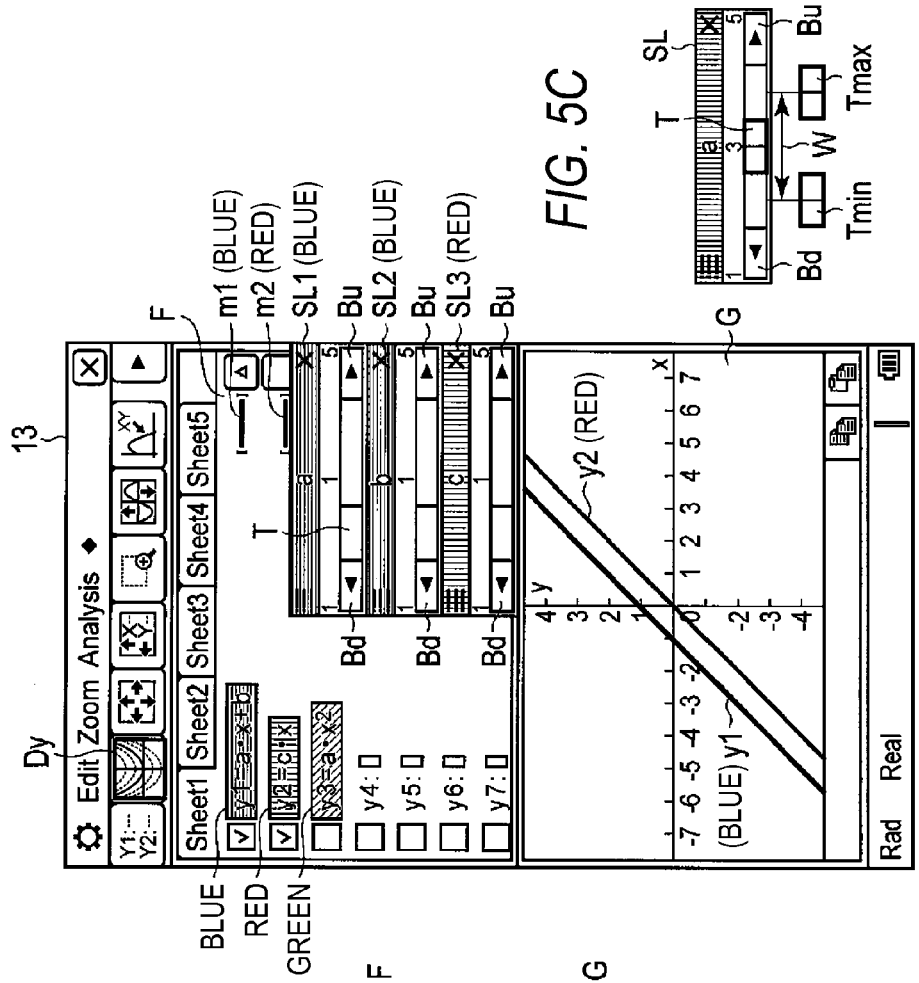
FIGS. 5A to 5C are diagrams showing a display operation (No. 1) according to the graph drawing processing of the graph function electronic calculator 10.

FIGS. 5A to 5C are diagrams showing a display operation (No. 1) according to the graph drawing processing of the graph function electronic calculator 10.

Figure 6B:
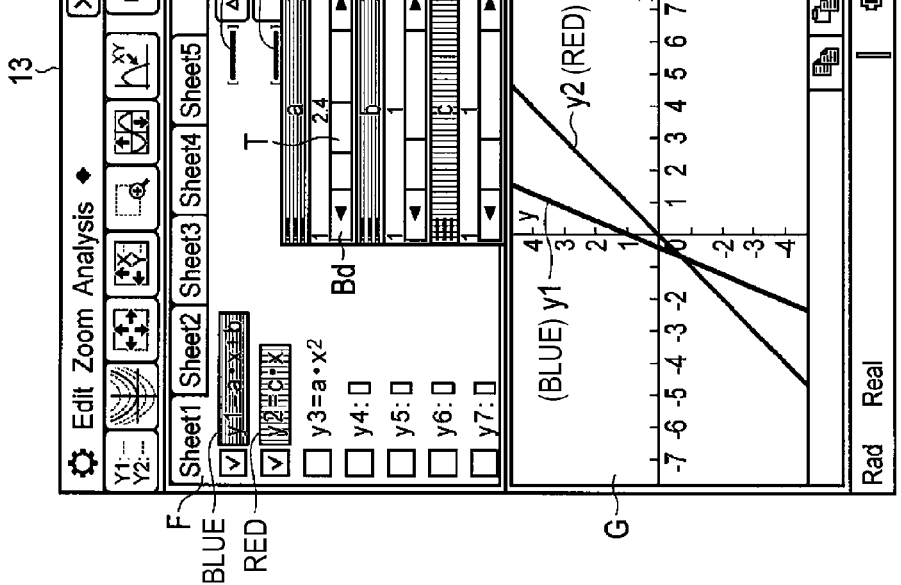
FIGS. 6A to 6B are diagrams showing a display operation (No. 2) according to the graph drawing processing of the graph function electronic calculator 10.
Figure 6A:
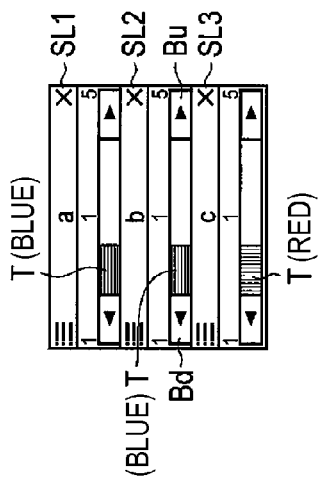

FIGS. 6A and 6B are diagrams showing a display operation (No. 2) according to the graph drawing processing of the graph function electronic calculator 10.

As shown in FIG. 1, when the [Graph & Table] icon GT is touched and selected on the main menu M displayed on the touch panel display part 13 according to the touch operation of the menu button [Menu], the graph mode is activated. Thus, as shown in FIG. 5A, the graph formula area F and the graph image area G are displayed at the upper half area and the lower half area of the touch panel display part 13, respectively (YES in step S1).

When the position of the formula number yn is designated in the graph formula area F by the touch operation and the function formula with a parameter is inputted according to the operation of the key input part 12 (step S2), the function formula thus inputted is stored in the numerical formula data memory area 15d. Then, this function formula is displayed with a display color set in advance individually according to the designated formula number yn (step S3).

In this embodiment, the inputted function formula y1=a·x+b is displayed in blue, the function formula y2=c·x is displayed in red and the function formula y3=a·$x^2$ is displayed in green. Further, drawing color marks m1, m2, m3 representing the drawing colors of the lines of graph images corresponding to the function formulas y1, y2 and y3 are displayed by the same colors as those of these function formulas, respectively.

In this manner, in the graph formula area F where the arbitrary function formulas y1, y2, y3 are inputted, when a check box Bc positioned at the head position of each of the function formulas y1, y2 is touched and designated, a check mark is added to each of the function formulas y1, y2 to be displayed as the graph images (step S4).

As to each of the function formulas y1, y2 added with the check marks, when the execution icon Dy for a dynamic graph mode is touched as shown in FIG. 5B in order to display the change of the graph image according to the function formula while changing the parameter of the function formula (YES in step S5), the process proceeds to the parameter slider setting processing of FIG. 4 (step SA).

In this parameter slider setting processing, as to each of the function formulas y1, y2 designated as subjects to be drawn, the detection of the parameter is started sequentially from the head portion of the corresponding one of the function formulas (step A1). First, "1" is set as the detection number I of the parameter (step A2).

First, when it is determined that the parameter "a" of the function formula of y1=a·x+b is detected (YES in step A3), the parameter "a" is stored in the parameter data memory area 15e. Then, it is determined whether or not numerical values (minimum value, maximum value, current value, change value) for changing and setting this parameter value are already stored in the slider pattern table 15f (step A4).

When it is determined that the numerical values for changing the parameter "a" are not stored (NO in step A4), initial values (minimum value "1", maximum value "5", current value "1", change value "1") corresponding to the parameter slider SL1 (I=1) of the parameter "a" are set and stored in the slider pattern table 15f (step A6).

In contrast, when it is determined that the numerical values for changing and setting the value of the parameter detected in step A3 are already stored in the slider pattern table 15f (YES in step A4), these original numerical values (minimum value, maximum value, current value, change value) of the parameter are set as they are in correspondence to the parameter slider SLn (I=n) of the detected parameter (step A5).

Then, it is determined whether or not the parameter "a" detected from the function formula y1=a·x+b is contained in the other function formula y2=c·x to be drawn (step A7). When it is determined that the parameter "a" is not contained in the other function formula (NO in step A7), the display color of the parameter slider SL1 of the parameter "a" is set to blue which is the same color as the display color of the function formula y1 containing the parameter "a" and stored in the slider pattern table 15f (step A8).

When it is determined that the parameter detected in step A3 is also contained in the other function formula yn to be drawn (YES in step A7), the display color of the parameter slider SLn (I=n) of the detected parameter is set to a common color (for example, yellow) which does not correspond to any of the display colors of the respective function formulas yn - - - to be drawn and stored in the slider pattern table 15f (step A9).

In this manner, when the parameter value and the display color of the parameter slider SLn as to each of the parameters detected from the function formulas yn to be drawn are set and stored, it is determined whether or not the detection number I of the parameters reaches 3 (step A10).

When it is determined that the detection number I of the parameters does not reach 3 (NO in step A10), it is determined whether or not there is another parameter other than the detected parameter "a" as to each of the function formulas y1 and y2 to be drawn (step A11).

When it is confirmed that there is another parameter other than the detected parameter "a" (NO in step A11), the detection number I of the parameters is incremented to "2" (step A12). Then, the detection of the next parameter is started as to the function formulas y1 and y2 to be drawn (step A13).

Thereafter, the processing of step A3 and the succeeding processing are performed, whereby the initial values (minimum value "1", maximum value "5", current value "1", change value "1") corresponding to the parameter slider SL2 (I=2) of the next parameter "b" detected from the function formula y1=a·x+b to be drawn are set and stored in the slider pattern table 15f (steps A3, A4→step A6).

Then, the display color of the parameter slider SL2 of the detected parameter "b" is set to blue which is the same color as the display color of the function formula y1 containing the parameter "b" and stored in the slider pattern table 15f (step A7→step A8).

Then, when it is determined that the detection number I of the parameters does not reach 3 (NO in step A10) and further that there is another parameter other than the detected parameters "a" and "b" as to the function formulas y1 and y2 to be drawn (NO in step A11), the detection number I of the parameters is incremented to "3" (step A12). Then, the detection of the next parameter is started as to the function formulas y1 and y2 (step A13).

Thereafter, the processing of step A3 and the succeeding processing are performed, whereby the initial values (minimum value "1", maximum value "5", current value "1", change value "1") corresponding to the parameter slider SL3 (I=3) of the next parameter "c" detected from the next function formula y2=c·x to be drawn are set and stored in the slider pattern table 15f (steps A3, A4→(step A6).

Then, the display color of the parameter slider SL3 of the detected parameter "c" is set to red which is the same color as the display color of the function formula y2 containing the parameter "c" and stored in the slider pattern table 15f (step A7→step A8).

Then, when it is determined that the detection number I of the parameters reaches 3 (YES in step A10) or that there is not any other parameter other than the detected parameters (YES in step A11), the series of parameter slider setting processing is terminated (return).

In step A3, when it is determined that no parameter is detected from the function formula n designated as a subject to be drawn (NO in step A3), the series of setting processing of the parameter slider SLn (steps A3 to A13) is not performed (step A14).

In this manner, according to the parameter slider setting processing, the parameter numerical values (minimum value "1", maximum value "5", current value "1", change value "1") and the corresponding display color (blue, blue or red) are set and stored in the slider pattern table 15f in relation to each of the parameter sliders SL1, SL2, SL3 respectively corresponding to the three parameters "a", "b", "c" sequentially detected from the function formulas y1=a·x+b and y2=c·x to be drawn (step SA). Then, as shown in FIG. 5B, each of the parameter sliders SL1, SL2, SL3 is displayed in the graph formula area F so as to have a bar with the corresponding color thus set (step S6).

As shown in FIGS. 5B and 5C, each of the parameter sliders SL1, SL2, SL3 has the left button "←" Bd and the right button "→" Bu for setting the numerical value of the corresponding parameter according to the set values (minimum value "1", maximum value "5", current value "1", change value "1") and also has the knob T representing the current value of the corresponding parameter in the rod-shaped variable range W (Tmin to Tmax) extending between the left and right buttons Bd and Bu. When the knob T is moved to the left or right direction, a value corresponding to the moved position is displayed as a current numerical value of the corresponding parameter in a parameter value area on the variable range W.

The knob T of each of the parameter sliders SL1, SL2, SL3 is at first displayed at the set current value "1".

Thus, data of the graph images y1, y2 according to the function formulas y1=a·x+b and y2=c·x to be drawn in which each of the parameters "a", "b" and "c" is set to the set current value "1" is drawn in the graph data memory area 15g according to the XY coordinate range stored in the range data memory area 15c. Then, the graph image y1 is displayed in the graph image area G with blue which is the same display color as the function formula y1=a·x+b and the parameter sliders SL1, SL2 of the parameters "a", "b" thereof. Further, the graph image y2 is displayed in the graph image area G with red which is the same display color as the function formula y2=c·x and the parameter slider SL3 of the parameter "c" thereof (step S7).

Incidentally, in the parameter sliders SL1, SL2 and SL3 respectively corresponding to the parameters "a", "b" and "c" contained in the function formulas y1, y2 to be drawn, each of the bars at the upper portions of these sliders is discriminately displayed by the same color as the display color of the corresponding one of the function formulas y1, y2 containing the corresponding parameter. However, as shown in FIG. 6A, each of the knobs T of the parameter sliders SL1, SL2 and SL3 may be discriminately displayed by the same color as the display color of the corresponding one of the function formulas y1, y2 containing the corresponding parameter. Further, as shown in FIG. 6A, the parameters "a", "b" and "c" displayed in the parameter sliders SL1, SL2 and SL3 may be discriminately displayed by blue, blue and red, respectively, so that each of these parameters is displayed by the same color as the display color of the corresponding one of the function formulas y1, y2.

When the knob T of the parameter slider SLn of one of the parameters contained in the function formulas y1, y2 is moved to the left or right direction by the touch operation (YES in step S12), the numerical value of this parameter is reset to a value corresponding to the moved position of this knob T on a dot unit basis (step S13).

Then, the graph image y1 or y2 according to the function formula y1 or y2 which parameter value has been reset by the parameter slider SLn is drawn again, and this updated graph image is displayed in the graph image area G (step S11).

To be concrete, in the parameter slider SL1 (current value "1") of the parameter "a" contained in the function formula y1=a·x+b displayed by blue in the graph formula area F as shown in FIG. 5B, when the corresponding knob T is touched and moved to the right direction as shown in FIG. 6B (YES in step S12), the value of the parameter "a" is reset to "2.4" according to the moved position of the knob T on the dot unit basis (step S13). Then, the graph image y1 according to the function formula y1 which value of the parameter "a" has been reset to "2.4" is drawn again, and this updated graph image is displayed in the graph image area G (step S11).

Alternatively, when the left button "←" Bd or the right button "→" Bu of the parameter slider SLn corresponding to one of the parameters contained in the function formulas y1, y2 to be drawn is touched (YES in step S8), the value of this parameter is incremented or decremented by a change value on a step unit basis at every touch operation from the current value and then reset (step S9). Then, the knob T is moved to a position corresponding to the parameter value thus reset and displayed (step S10).

Then, the graph image y1 or y2 according to the function formula y1 or y2 which parameter has been reset by the parameter slider SLn is drawn again, and this updated graph image is displayed in the graph image area G (step S11).

In this manner, the graph images y1, y2 according to the function formulas y1, y2 inputted by a user are displayed, and then the value of an arbitrary one of the parameters contained in the function formulas y1, y2 is changed using the corresponding parameter slider SLn, to thereby change and analyze the corresponding one of the graph images y1, y2. In this case, the display color of the corresponding parameter slider SLn is made same as the display color of the corresponding function formula y containing the one parameter and the display color of the graph image y according to the corresponding function formula y. Thus, the graph image y corresponding to the parameter to be changed can be easily discriminated.

FIGS. 7A to 7D are diagrams showing a display operation (No. 3) according to the graph drawing processing of the graph function electronic calculator 10.

Figure 8A:
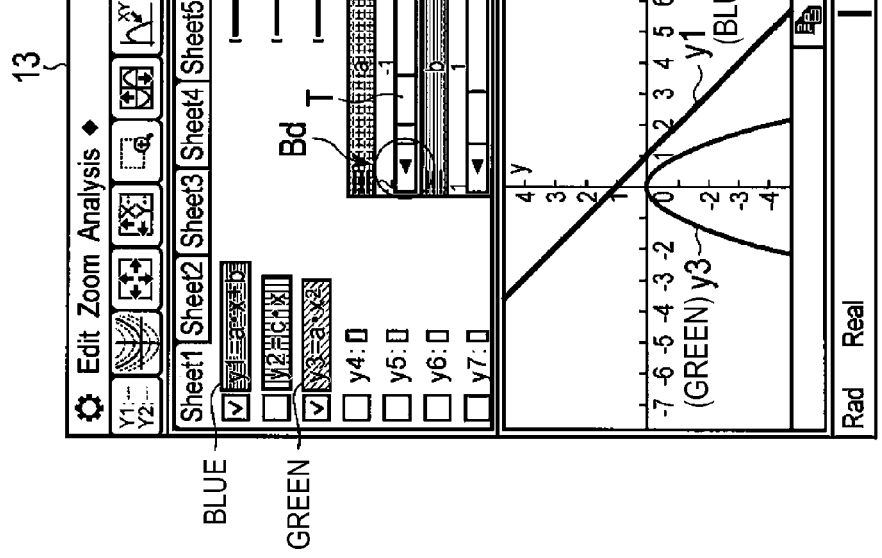
FIGS. 8A to 8C are diagrams showing a display operation (No. 4) according to the graph drawing processing of the graph function electronic calculator 10.
Figure 8B:
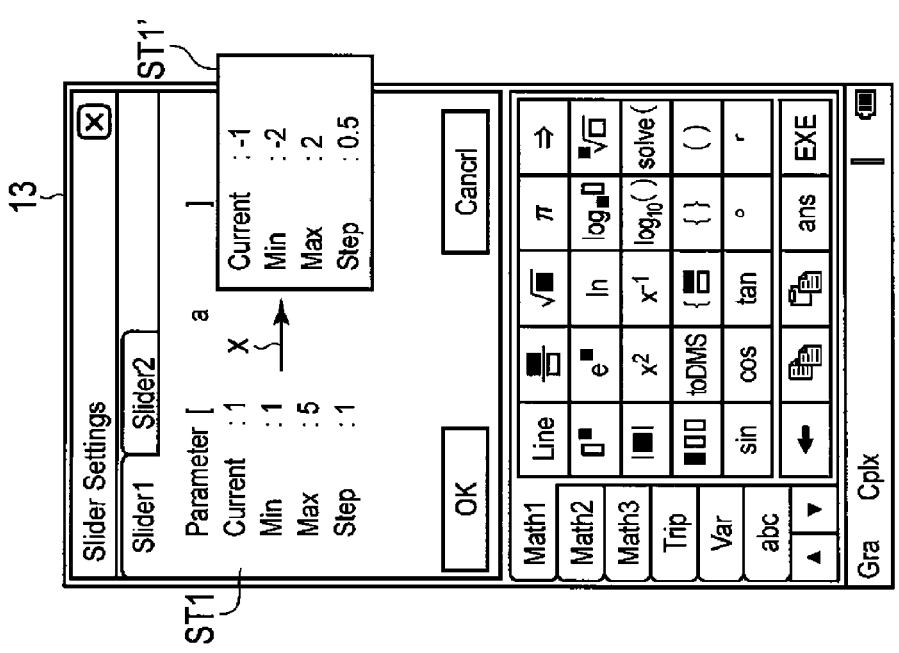
Figure 8C:
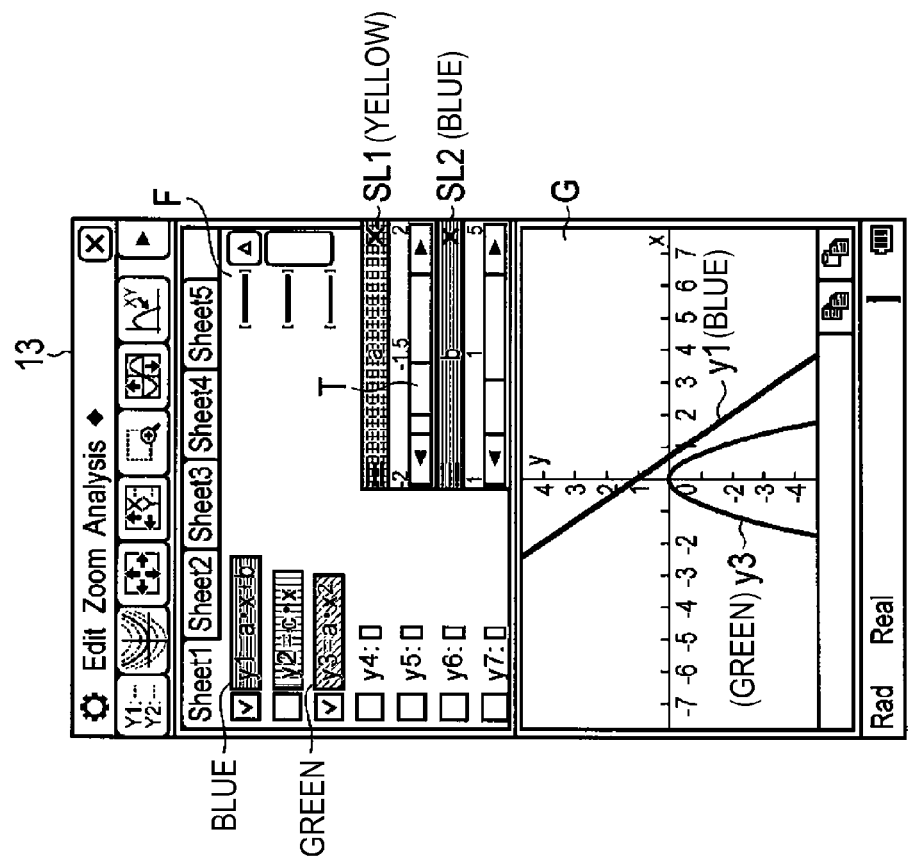

FIGS. 8A to 8C are diagrams showing a display operation (No. 4) according to the graph drawing processing of the graph function electronic calculator 10.

Figure 7A:
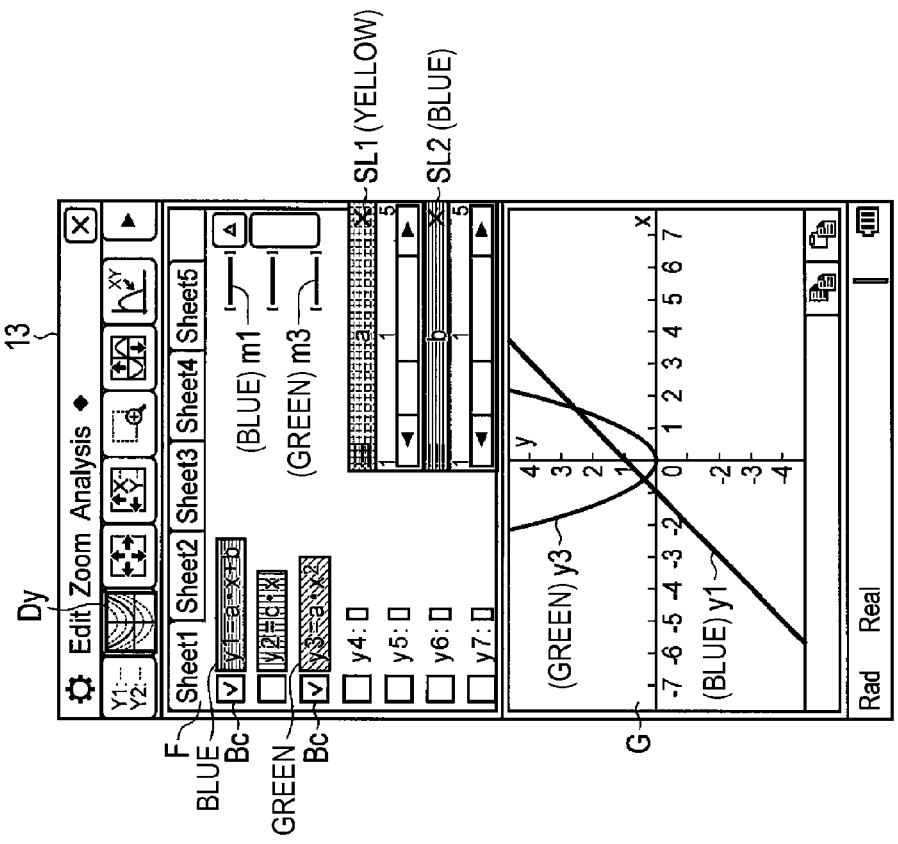
FIGS. 7A to 7D are diagrams showing a display operation (No. 3) according to the graph drawing processing of the graph function electronic calculator 10.

As shown in FIG. 5A, the three function formulas $y1=a \cdot x+b$, $y2=c \cdot x$ and $y3=a \cdot x^2$ inputted by a user are discriminately displayed by blue, red and green set in advance in the graph formula area F of the touch panel display part 13, respectively. In a state that the two function formulas y1 and y3 among these function formulas are designated as subjects to be displayed as shown in FIG. 7A (steps S1 to S4), when the execution icon Dy for a dynamic graph mode is touched (YES in step S5), the process proceeds to the parameter slider setting processing shown in FIG. 4 (step SA).

As to the function formulas y1, y3 designated as subjects to be drawn, the detection of the parameter is started sequentially from the head portion of the corresponding one of the function formulas (step A1). Then, "1" is set as the detection number I of the parameter (step A2).

First, when it is determined that the parameter "a" of the function formula $y1=a \cdot x+b$ is detected (YES in step A3), the parameter "a" is stored in the parameter data memory area 15e. Then, it is determined whether or not numerical values (minimum value, maximum value, current value, change value) for changing and setting this parameter value are already stored in the slider pattern table 15f (step A4).

When it is determined that the numerical values for changing the value of the parameter "a" are already stored (YES in step A4), the original values of the parameter (minimum value "1", maximum value "5", current value "1", change value "1") are set as they are in corresponding to the parameter slider SL1 of the detected parameter "a" (step A5).

When it is determined that the parameter "a" detected from the function formula $y1=a \cdot x+b$ is also contained in the other function formula $y3=a \cdot x^2$ as a subject to be drawn (YES in step A7), the display color of the parameter slider SL1 of the detected parameter "a" is set to the common color "yellow" which differs from each of the display colors of the respective function formulas y1, y3 to be drawn and stored in the slider pattern table 15f (step A9).

When it is determined that the detection number I of the parameters does not reach 3 (NO in step A10) and that there is another parameter other than the detected parameter "a" as to the function formulas y1 and y3 to be drawn (NO in step A11), the detection number I of the parameters is incremented to "2" (step A12). Then, the detection of the next parameter is started as to the function formulas y1 and y3 to be drawn (step A13).

Thereafter, the processing of step A3 and the succeeding processing are performed, whereby the original parameter values (minimum value "1", maximum value "5", current value "1", change value "1") corresponding to the parameter slider SL2 (I=2) of the next parameter "b" detected from the function formula $y1=a \cdot x+b$ to be drawn are set as they are and stored in the slider pattern table 15f (steps A3, A4, A5).

When it is determined that the detection number I of the parameters does not reach 3 (NO in step A10) but that there is not any parameter other than the detected parameters "a" and "b" as to the function formulas y1 and y3 to be drawn (YES in step A11), the series of parameter slider setting processing is terminated (return).

In this manner, according to the parameter slider setting processing, the parameter numerical values (minimum value "1", maximum value "5", current value "1", change value "1") and the corresponding display color (yellow (common color) or blue) are set and stored in the slider pattern table 15f in relation to each of the parameter sliders SL1, SL2 respectively corresponding to the two parameters "a", "b" sequentially detected from the function formulas $y1=a \cdot x+b$ and $y3=a \cdot x^2$ to be drawn (step SA). Then, as shown in FIG. 7A, each of the parameter sliders SL1, SL2 is displayed in the graph formula area F so as to have a bar with the corresponding color thus set (step S6).

Thus, data of the graph images y1, y3 according to the function formulas $y1=a \cdot x+b$ and $y3=a \cdot x^2$ to be drawn in which each of the parameters "a" and "b" is set to the set current value "1" is drawn in the graph data memory area 15g according to the XY coordinate range stored in the range data memory area 15c. Then, the graph image y1 is displayed in the graph image area G with blue which is the same display color as the function formula $y1=a \cdot x+b$ and the parameter slider SL2 of the parameters "b" that is contained only in this formula. Further, the graph image y3 is displayed in the graph image area G with green which is the same display color as the function formula $y3=a \cdot x^2$ (step S7).

Figure 7C:
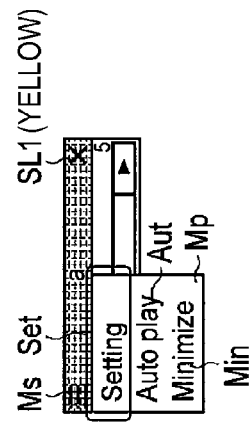
Figure 7D:
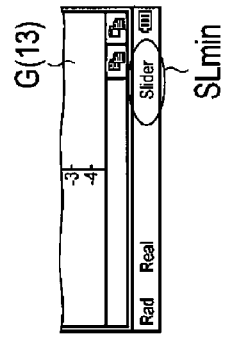
Figure 7B:
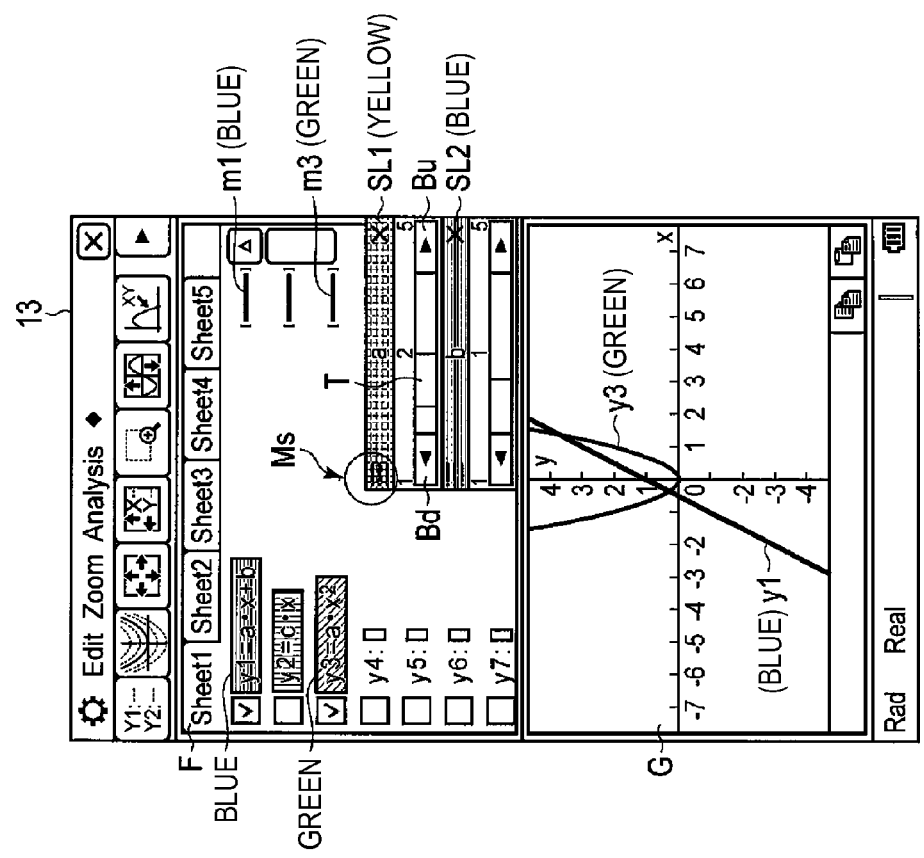

As shown in FIG. 7B, when the right button "→" Bu of the parameter slider SL1 of the common parameter "a" contained in each of the function formulas y1 and y3 to be drawn is touched once (YES in step S8), the value of the parameter "a" is incremented by the change value "1" on the step unit basis from the current value "1" to thereby be reset to "2" (step S9). Then, the knob T is moved to a position corresponding to the parameter value "2" of the parameter "a" thus reset and displayed (step S10).

Then, the graph images y1 and y3 according to the function formulas y1 and y3 which parameter "a" has been reset by the parameter slider SL1 are drawn again, and these updated graph images are displayed in the graph image area G (step S11).

In this manner, the graph images y1, y3 according to the function formulas $y1=a \cdot x+b$ and $y3=a \cdot x^2$ are displayed by blue and green which are the same display colors as the corresponding function formulas, respectively. Further, the parameter slider SL1 of the parameter "a" which is commonly contained in the function formulas y1, y3 is displayed by yellow that means the common color different from each of the display colors of the function formulas y1, y3. Thus, each of the graph images y1, y3 corresponding to the parameter "a", which is common to the function formulas y1, y3 and changeable by the parameter slider SL1, can be recognized easily even before the change of the parameter value.

When a menu icon Ms shown at the parameter slider SL1 of the parameter "a" displayed in the graph formula area F is touched (YES in step S15), a pull-down menu Mp for the parameter slider SL1 is displayed as shown in FIG. 7C (step S16).

The pull-down menu Mp includes three items of [Setting] Set, [Auto Play] Aut and [Minimize] Min. When the [Setting] Set is touched and selected (YES in step S17), a parameter value setting screen ST1 for the corresponding parameter slider SL1 is displayed as shown in FIG. 8A. In this case, the current value (Current), minimum value (Min), maximum value (Max) and change value (Step) of the parameter "a" can be set and changed (step S18).

In this parameter value setting screen ST1 for the corresponding parameter slider SL1, according to the user operation, the current value (Current) is set to "−1", the minimum value (Min) is set to "−2", the maximum value (Max) is set to "2" and the change value (Step) is set to "0.5" to thereby change this screen into a screen ST1' as shown by an arrow x (step S19). Then, when it is determined that the setting of this parameter value setting screen is completed in response to the touch operation of an [OK] button (YES in step S21), the respective setting values, that is, the minimum value, the maximum value and the current value of the parameter slider SL1 are reset to "−2", "2" and "−1", respectively. Further, the corresponding knob T is moved to a position corresponding to the current value "−1" thus reset and displayed (steps S8 to S10).

Then, the graph images y1 and y3 respectively according to the function formulas y1 and y3 which value of the parameter "a" has been reset to "−1" by the parameter slider SL1 are drawn again, and these updated graph images are displayed in the graph image area G (step S11).

When a parameter tab is switched to [Slider 2] from [Slider 1] in the parameter value setting screen ST1 (ST1') for the parameter slider SL1 (YES in step S20), a parameter value setting screen ST2 for the parameter slider SL2 of the parameter "b" is displayed (step S18).

When the left button "←" Bd of the parameter slider SL1 is touched once (YES in step S8), as shown in FIG. 8C, the value of the parameter "a" is decremented by the change value "0.5" on the step unit basis from the current value "−1" to thereby reset to "−1.5" (step S9). Then, the knob T is moved to a position corresponding to the parameter value "−1.5" of the parameter "a" thus reset and displayed (step S10).

Then, the graph images y1 and y3 according to the function formulas y1 and y3 which value of the parameter "a" has been reset to "−1.5" by the parameter slider SL1 are drawn again, and these updated graph images are displayed in the graph image area G (step S11).

On the other hand, when the [Auto Play] Aut is selectively touched in the pull-down menu Mp for the parameter slider SL1 shown in FIG. 7C (YES in step S22), the value of the parameter "a" in each of the function formulas y1=a·x+b and y3=a·x² to be drawn is repeatedly changed from the minimum value "−2" to the maximum value "2" at every change value "0.5" of the step unit of the parameter "a" thus changed. Thus, the corresponding graph images y1, y3 are sequentially drawn and displayed according to the change of the parameter value (step S23).

When it is determined that a button [AC] or [EXIT] is operated by a user (YES in step S24), the automatic changing processing of the value of the parameter "a" according to the selection of the [Auto Play] Aut is terminated.

When the [Minimize] Min is selectively touched in the pull-down menu Mp for the parameter slider SL1 shown in FIG. 7C (YES in step S25), the display of each of the parameter sliders SL1 and SL2 is erased in the graph formula area F. Further, as shown in FIG. 7D, a minimized slider icon SLmin is displayed at the lower end of the touch panel display part 13 (step S26). In this situation, when the minimized slider icon SLmin is touched, the display of the parameter sliders SL1 and SL2 are restored in the graph formula area F.

Incidentally, when the graph formula area F is touched in the touch panel display part 13 where the graph images yn according to the respective parameter formulas yn are drawn and displayed (YES in step S14), the processing returns to the input processing of an arbitrary function formula yn with respect to the graph formula area F (step S2).

In this manner, according to the graph drawing function (see FIGS. 5A to 5C, FIGS. 6A and 6B) of the graph function electronic calculator 10 thus configured, the graph images y1, y2 according to the function formulas y1=a·x+b and y2=c·x designated as subjects to be drawn are displayed, and then values of the parameters "a", "b" and "c" contained in the function formulas y1, y2 are changed using the corresponding parameter sliders SL1, SL2 and SL3, to thereby change and analyze the corresponding graph images y1, y2. In this case, the display color of each of the parameter sliders SL1, SL2 and SL3 is made same as the display color of the corresponding one of the function formulas y1 and y2 containing the parameters "a", "b" and "c" and the display color of the corresponding one of the graph images y1 and y2 according to the function formulas y1 and y2. Thus, the graph image y1 or y2 corresponding to each of the parameters "a", "b" and "c" of the function formulas to be changed can be easily discriminated.

Further, according to the graph drawing function (see FIGS. 7A to 7D, FIGS. 8A to 8C) of the graph function electronic calculator 10 thus configured, the parameter slider SL1 of the parameter "a" which is commonly contained in the function formulas y1, y3 designated as subjects to be drawn is displayed by yellow that means the common color different from each of the display colors of the respective function formulas yn - - - . Thus, when the value of the parameter "a" is changed using the parameter slider SL1, it can be easily recognized that each of the graph images y1, y3 according to the function formulas y1, y3 to be drawn is drawn in a changing manner in its shape.

The aforesaid embodiment is configured in a manner that the function formulas y1, y2, - - - designated as subjects to be drawn, the graph images y1, y2, - - - according to the function formulas y1, y2, - - - , and the parameter sliders SL1, SL2, - - - for setting and changing the values of the parameters "a", "b", - - - contained in the function formulas y1, y2, - - - are discriminately displayed so as to be displayed in different colors respectively according to the corresponding function formulas y1, y2, - - - , or partially in the same color. In addition, as shown in FIG. 9 explained below, the graph images y according to the function formulas having parameter values changeable by the sliders SLn may be discriminately displayed so as to be different in their kinds of the lines depending on the parameter sliders SL1, SL2, - - - .

Figure 9:
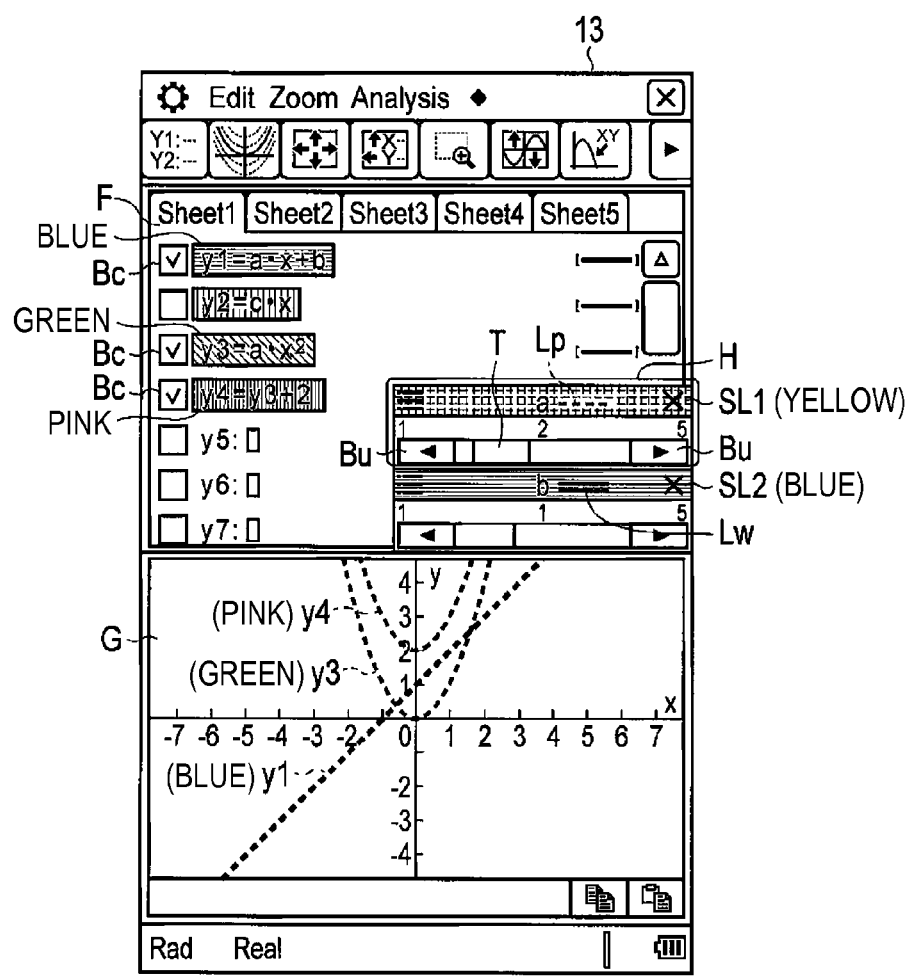
FIG. 9 is a diagram showing the display operation of another embodiment according to the graph drawing processing of the graph function electronic calculator 10.

FIG. 9 is a diagram showing the display operation of another embodiment according to the graph drawing processing of the graph function electronic calculator 10.

That is, in the embodiment shown in FIG. 9, each of three function formulas y1=a·x+b, y3=a·x$^2$ and y4=y3+2 designated as subjects to be drawn has the parameter "a" common to these function formulas y1, y3 and y4 (since the function formula y4 contains y3 (=a·x$^2$), this formula can be regarded as y4=a·x$^2$+2 and hence is determined to commonly contain the parameter "a") and only the function formula y1 has the parameter "b". The parameter slider SL1 of the parameter "a" is displayed by yellow which is a common color set in advance and represents that this parameter is common to the function formulas y1, y3 and y4. Further, on the parameter slider SL1, a dotted line Lp is displayed as a guide notation so as to represent the kind of a line of each of the graph images y1, y3 and y4 which shape changes according to the change of the value of the parameter "a". Further, the parameter slider SL2 of the parameter "b" is displayed by blue which is same as the display color of the function formula y1. On the parameter slider LS2, a double dotted line Lw is displayed as a guide notation so as to represent the kind of a line of the graph image y1 which shape changes according to the change of the value of the parameter "b".

When the left button "←" Bd or the right button "→" Bu of the parameter slider SL1 is touched, the value of this parameter "a" is changed on the step unit basis at every touch operation and reset (steps S8 to S10). Alternatively, when the knob T of the parameter slider SL1 is moved to the left or right direction, the value of the parameter "a" is changed on the dot nit basis and reset (steps S12 and S13). Each of the graph images y1, y3 and y4 according to the function formulas y1, y3 and y4, each value of the parameter "a" thereof having been changed to the reset value ("2" in this case), is drawn again discriminately by the dotted line Lp having the line kind associated with the parameter "a" thus reset, and these updated graph images are displayed in the graph image area G (step S11).

Thus, it can be more easily recognized that when the value of the parameter "a" is changed using the parameter slider SL1, each of the graph images y1, y3 and y4 according to the function formulas y1, y3 and y4 to be drawn is drawn in a changing manner in its shape.

In this case, the parameter slider SLn may be discriminately displayed by surrounding it using a red frame H, for example, during a period where the parameter value is being changed using the parameter slider SLn or during a period from the start of the changing of the parameter value to a time point just after the termination of the changing. Thus, the relation among the parameter to be changed, the function formula yn including this parameter and the graph image yn according to this function formula yn can be shown clearly.

When the [Auto Play] Aut is selectively touched in the pull-down menu Mp (see FIG. 7C) for the parameter slider SL1 (YES in step S22), the value of the parameter "a" in each of the function formulas y1, y3 and y4 to be drawn is repeatedly changed from the minimum value to the maximum value thereof at every change value (Step) of the step unit of the parameter "a". In this case, also each of the corresponding graph images y1, y3 and y4 is discriminately drawn again by the dotted line Lp which line kind is associated with the parameter "a" being reset (step S23).

In each of the aforesaid embodiments, the explanation is made that each of the left button Bd and the right button Bu of the parameter slider SLn and the knob T displayed on the touch panel display part 13 is operated by the touching of a user. However, in the case of operating the graph function electronic calculator 10 according to each of these embodiments on a personal computer as an emulator, of course, each of the left button Bd and the right button Bu may be operated by placing a mouse pointer thereon and left-clicking the mouse. Also, of course, the knob T may be operated by positioning a mouse pointer thereon and then moving the mouse pointer while left-clicking the mouse.

Further, in each of the aforesaid embodiments, the explanation is made that the parameter slider SLn is used as the operation display element for designating according to the user operation the value of each of the parameters contained in the function formulas y=f(x) inputted by a user. However, for example, a numerical value arrangement display such as [a=1, 2, 3, 4, 5] may be displayed as the operation display element for changing the value of the parameter "a" so as to touch and select a desired value. Alternatively, a cursor discriminately displaying one of the numerical values within the numerical value arrangement display may be moved according to the operation of a left key or a right key to thereby select a desired value.

Each of the methods of the respective processing according to the graph display control device described in the aforesaid embodiments, that is, each of the methods of the respective processing such as the graph drawing processing shown in the flowcharts of FIGS. 3A and 3B and the parameter slider setting processing according to the graph drawing processing shown in the flowchart of FIG. 4 can be stored, as a program executable by a computer, into a medium for an external storage device such as a memory card (ROM card, RAM card etc.), a magnetic disc (floppy disc, hard disc etc.), an optical disc (CD-ROM, DVD etc.) or a semiconductor memory, and then distributed. The computer (control deice) of the electronic device provided with a display unit capable of inputting data by a user is controlled in its operations by the program which is read from the medium of the external storage device and written into the memory unit of the computer. Thus, the aforesaid graph drawing functions explained in the respective embodiments can be realized and the processing similar to the aforesaid methods can be executed.

The program data for realizing the aforesaid respective methods can be transmitted on a communication network in the form of program codes. Then, the program data may be fetched and stored into the memory unit of the electronic device provided with the display unit capable of inputting data by a user to thereby also realize the aforesaid graph drawing functions.

The invention is not limited to the respective embodiments and may be modified in various manners within a range not departing from the gist of the invention at the time of implementing the invention. For example, although in step A6 of FIG. 4, the initial values (minimum value "1", maximum value "5", current value "1", change value "1") are set in correspondence to the parameter slider SL1 (I=1), the initial values may be set to (minimum value "−10", maximum value "10", current value "1", change value "1"), for example. In this case, at first, a graph having the standard parameter value "1" is displayed and then a graph which parameter value is changeable to the same absolute value in the positive and negative values can be displayed sequentially.

Further, in steps S12 and S13 of FIG. 4, when the knob T of the parameter slider SLn of one of the parameters is moved to the left or right direction by the touch operation, the value of this parameter is reset to a value corresponding to the moved position of this knob T on the dot unit basis. However, the knob T may be arranged to move stepwise by a fixed change value corresponding to the parameter slider. For example, the initial change value is set to "1", and hence the knob can be quickly moved to a desired position on the parameter slider at every change value "1", whereby the graph image corresponding to the parameter value of the parameter slider can be drawn quickly. In this case, when the change value is set to a desired small value such as "0.2" or "0.01", the knob can be quickly moved accurately to a desired position on the parameter slider at every desired small value, whereby the graph image corresponding to the parameter value of the parameter slider can be drawn quickly.

Further, since each of the embodiments contains inventions at various stages, various kinds of inventions can be extracted by suitably combining the constituent elements disclosed therein. For example, even in a case where at least one constituent element is deleted from the entirety of the constituent elements in each of the embodiments or some of the constituent elements of the embodiments are suitably combined so as to form a different mode, if the problem described in the "Problems that the Invention is to Solve" is solved and the effects described in the "Effects of the Invention" is attained, this configuration obtained by the deletion of the at least one constituent element or the combination of the constituent elements can be extracted as the invention.

The invention claimed is:

1. A graph display control device, comprising:
a display; and
a processor configured to perform processes including:
displaying a plurality of function formulas containing parameters on the display, the plurality of function formulas including a first function formula having a first parameter and a second function formula having a second parameter;
displaying a first graph image corresponding to the first function formula on the display in a first display format in a state in which a parameter value is contained in the first parameter, and displaying a second graph image corresponding to the second function formula on the display in a second display format that is different from the first display format in a state in which a parameter value is contained in the second parameter;
displaying, when no parameter value is commonly contained in the first and second function formulas, a first operation display element for designating a numerical value of the first parameter on the display in the first display format, and displaying a second operation display element for designating a numerical value of the second parameter on the display in the second display format; and
displaying, when a parameter is commonly contained in the first and second function formulas, a third operation display element for designating a numerical value of the commonly-contained parameter in a third display format which is different from the first and second display formats.

2. The graph display control device according to claim 1, wherein:
the first operation display element is displayed in a first display color as the first display format and the second operation display element is displayed in a second display color as the second display format, and
the displaying of the third operation display element comprises:
displaying the third operation display element in a third display color that is different from the first and second display colors.

3. The graph display control device according to claim 1, wherein the processor is configured to perform processes including:
displaying the first graph image on the display in the first display format using a first kind of line;
displaying the second graph image on the display in the second display format using the first kind of line;
displaying, when a parameter is commonly contained in the first and second function formulas, the third operation display element for designating the numerical value of the commonly-contained parameter to indicate a second kind of line; and
when the numerical value of the commonly-contained parameter is designated according to an operation by a user with respect to the third operation display element indicating the second kind of line, changing the first kind of line used to display each of the corresponding first and second graph images displayed on the display in correspondence to the first and second function formulas to the second kind of line.

4. The graph display control device according to claim 1, wherein the processor is configured to perform a process including:
determining whether or not a parameter is commonly contained in the first and second function formulas,
wherein the determining comprises, when one of the first and second function formulas contains another of the function formulas therein, determining whether or not a parameter is commonly contained in the function formulas by replacing said another function formula within the one function formula by contents of said another function formula.

5. A graph display control device comprising:
a display; and
a processor configured to perform processes including:
displaying a plurality of function formulas containing parameters on the display, the plurality of function formulas including a first function formula having a first parameter and a second function formula having a second parameter;
displaying a first graph image corresponding to the first function formula on the display in a first display format in a state in which a parameter value is contained in the first parameter, and displaying a second graph image corresponding to the second function formula on the display in a second display format that is different from the first display format in a state in which a parameter value is contained in the second parameter; and
displaying, when a parameter is commonly contained in the first and second function formulas, a third operation display element for designating a numerical value of the commonly-contained parameter in a third display format that is different from the first and second display formats.

6. A graph display control method performed by a processor of an electronic device including a display, the method comprising:
displaying a plurality of function formulas containing parameters on the display, the plurality of function formulas including a first function formula having a first parameter and a second function formula having a second parameter;

displaying a first graph image corresponding to the first function formula on the display in a first display format in a state in which a parameter value is contained in the first parameter, and displaying a second graph image corresponding to the second function formula on the display in a second display format that is different from the first display format in a state in which a parameter value is contained in the second parameter;

displaying, when no parameter value is commonly contained in the first and second function formulas, a first operation display element for designating a numerical value of the first parameter on the display in the first display format, and displaying a second operation display element for designating a numerical value of the second parameter on the display in the second display format; and displaying, when a parameter is commonly contained in the first and second function formulas, a third operation display element for designating a numerical value of the commonly-contained parameter in a third display format which is different from the first and second display formats.

7. The graph display control method according to claim 6, wherein:

the first operation display element is displayed in a first display color as the first display format and the second operation display element is displayed in a second display color as the second display format, and the displaying of the third operation display element comprises:

displaying the third operation display element in a third display color that is different from the first and second display colors.

8. The graph display control method according to claim 6, further comprising:

displaying the first graph image on the display in the first display format using a first kind of line;

displaying the second graph image on the display in the second display format using the first kind of line;

displaying, when a parameter is commonly contained in the first and second function formulas, the third operation display element for designating the numerical value of the commonly-contained parameter to indicate a second kind of line; and when the numerical value of the commonly-contained parameter is designated according to an operation by a user with respect to the third operation display element indicating the second kind of line, changing the first kind of line used to display each of the corresponding first and second graph images displayed on the display in correspondence to the first and second function formulas to the second kind of line.

9. The graph display control method according to claim 6, further comprising:

determining whether or not a parameter is commonly contained in the first and second function formulas, wherein the determining comprises, when one of the first and second function formulas contains another of the function formulas therein, determining whether or not a parameter is commonly contained in the function formulas by replacing said another function formula within the one function formula by contents of said another function formula.

10. A graph display control method performed by a processor of an electronic device including a display, the method comprising:

displaying a plurality of function formulas containing parameters on the display, the plurality of function formulas including a first function formula having a first parameter and a second function formula having a second parameter;

displaying a first graph image corresponding to the first function formula on the display in a first display format in a state in which a parameter value is contained in the first parameter, and displaying a second graph image corresponding to the second function formula on the display in a second display format that is different from the first display format in a state in which a parameter value is contained in the second parameter;

displaying, when no parameter value is commonly contained in the first and second function formulas, a first operation display element for designating a numerical value of the first parameter on the display in the first display format, and displaying a second operation display element for designating a numerical value of the second parameter on the display in the second display format; and displaying, when a parameter is commonly contained in the first and second function formulas, a third operation display element for designating a numerical value of the commonly-contained parameter in a third display format that is different from the first and second display formats.

11. A non-transitory computer readable medium storing a program executable by a computer of an electronic device including a display to perform functions comprising:

displaying a plurality of function formulas containing parameters on the display, the plurality of function formulas including a first function formula having a first parameter and a second function formula having a second parameter;

displaying a first graph image corresponding to the first function formula on the display in a first display format in a state in which a parameter value is contained in the first parameter, and displaying a second graph image corresponding to the second function formula on the display in a second display format that is different from the first display format in a state in which a parameter value is contained in the second parameter;

displaying, when no parameter value is commonly contained in the first and second function formulas, a first operation display element for designating a numerical value of the first parameter on the display in the first display format, and displaying a second operation display element for designating a numerical value of the second parameter on the display in the second display format; and displaying, when a parameter is commonly contained in the first and second function formulas, a third operation display element for designating a numerical value of the commonly-contained parameter in a third display format which is different from the first and second display formats.

12. The non-transitory computer readable medium according to claim 11, wherein:

the first operation display element is displayed in a first display color as the first display format and the second operation display element is displayed in a second display color as the second display format, and the displaying of the third operation display element comprises:

displaying the third operation display element in a third display color that is different from the first and second display colors.

13. The non-transitory computer readable medium according to claim 11, the functions executed by the computer further comprising:
    displaying the first graph image on the display in the first display format using a first kind of line;
    displaying the second graph image on the display in the second display format using the first kind of line;
    displaying, when a parameter is commonly contained in the first and second function formulas, the third operation display element for designating the numerical value of the commonly-contained parameter to indicate a second kind of line; and
    when the numerical value of the commonly-contained parameter is designated according to an operation by a user with respect to the third operation display element indicating the second kind of line, changing the first kind of line used to display each of the corresponding first and second graph images displayed on the display in correspondence to the first and second function formulas to the second kind of line.

14. The non-transitory computer readable medium according to claim 11, the functions executed by the computer further comprising:
    determining whether or not a parameter is commonly contained in the first and second function formulas,
    wherein the determining comprises, when one of the first and second function formulas contains another of the function formulas therein, determining whether or not a parameter is commonly contained in the function formulas by replacing said another function formula within the one function formula by contents of said another function formula.

15. A non-transitory computer readable medium storing a program executable by a computer of an electronic device including a display to perform functions comprising:
    displaying a plurality of function formulas containing parameters on the display, the plurality of function formulas including a first function formula having a first parameter and a second function formula having a second parameter;
    displaying a first graph image corresponding to the first function formula on the display in a first display format in a state in which a parameter value is contained in the first parameter, and displaying a second graph image corresponding to the second function formula on the display in a second display format that is different from the first display format in a state in which a parameter value is contained in the second parameter;
    displaying, when no parameter value is commonly contained in the first and second function formulas, a first operation display element for designating a numerical value of the first parameter on the display in the first display format, and displaying a second operation display element for designating a numerical value of the second parameter on the display in the second display format; and
    displaying, when a parameter is commonly contained in the first and second function formulas, a third operation display element for designating a numerical value of the commonly-contained parameter in a third display format that is different from the first and second display formats.

* * * * *